(12) United States Patent
Shimizu et al.

(10) Patent No.: US 9,971,331 B2
(45) Date of Patent: May 15, 2018

(54) MONITORING DEVICE FOR PROGRAMMABLE CONTROLLER

(71) Applicant: JTEKT Corporation, Osaka-shi (JP)

(72) Inventors: Akihiro Shimizu, Kariya (JP); Terukazu Senda, Obu (JP)

(73) Assignee: JTEKT CORPORATION, Osaka-shi (JP)

( * ) Notice: Subject to any disclaimer, the term of this patent is extended or adjusted under 35 U.S.C. 154(b) by 230 days.

(21) Appl. No.: 15/098,885

(22) Filed: Apr. 14, 2016

(65) Prior Publication Data

US 2016/0306333 A1    Oct. 20, 2016

(30) Foreign Application Priority Data

Apr. 20, 2015 (JP) ................. 2015-086040

(51) Int. Cl.
    G05B 11/00     (2006.01)
    G05B 19/00     (2006.01)
    G05B 19/042    (2006.01)

(52) U.S. Cl.
    CPC ........... *G05B 19/0428* (2013.01); *G05B 2219/23403* (2013.01); *G05B 2219/24015* (2013.01); *G05B 2219/24198* (2013.01)

(58) Field of Classification Search
    CPC ...... G05B 19/0428; G05B 2219/23403; G05B 2219/24015; G05B 2219/24198; G05B 19/056; G05B 2219/14107
    USPC ........................................ 700/11, 12, 23, 87
    See application file for complete search history.

(56) References Cited

U.S. PATENT DOCUMENTS

| 5,689,415 A * | 11/1997 | Calotychos ........... G05B 19/052 700/1 |
| 8,600,542 B2 * | 12/2013 | Fujishima ........... G05B 19/4067 700/177 |
| 2016/0116895 A1 * | 4/2016 | Yagi ................. G05B 19/058 700/79 |

FOREIGN PATENT DOCUMENTS

JP     2008-97079    4/2008

* cited by examiner

*Primary Examiner* — Michael J Brown
(74) *Attorney, Agent, or Firm* — Oblon, McClelland, Maier & Neustadt, L.L.P.

(57) ABSTRACT

A monitoring device for a programmable controller can resume continuous operation from an appropriate step, when the equipment is restarted after abnormality handling process. The monitoring device includes: a read device that reads operating state information of equipment from the programmable controller during individual operation; a relationship information storage device that stores relationship information showing relationship between the first step to be executed out of the steps when the equipment is restarted after the individual operation and the operating state information; a selection device that refers to the operating state information and selects the first step to be executed when the equipment is restarted, based on the relationship information; and a command transmission device that transmits a command to change an in-execution flag of the programmable controller which shows the first step to be executed when the equipment is restarted, based on the selection result of the selection device.

2 Claims, 10 Drawing Sheets

(FIRST EMBODIMENT)

(FIRST EMBODIMENT)

FIG. 8

(FIRST EMBODIMENT)

|  | ST001 | ST002 | ST003 | ST004 | ST005 |
|---|---|---|---|---|---|
| DOOR OPENING END | 1 | 0 | 0 | 0 | 0 |
| DOOR CLOSING END | 0 | 0 | 1 | 1 | 1 |
| CLAMPING END | 0 | 0 | 1 | 1 | 0 |
| UNCLAMPING END | 1 | 1 | 0 | 0 | 0 |
| KEEP COMPLETION OF MACHINING | 0 | 0 | 0 | 1 | 1 |

(SECOND EMBODIMENT)

MONITORING DEVICE FOR PROGRAMMABLE CONTROLLER

INCORPORATION BY REFERENCE

The disclosure of Japanese Patent Application No. 2015-086040 filed on Apr. 20, 2015 including the specification, drawings and abstract, is incorporated herein by reference in its entirety.

BACKGROUND OF THE INVENTION

1. Field of the Invention

The present invention relates to monitoring devices for programmable controllers which monitor the programmable controller executing a program written so as to include steps provided for respective operation units of equipment to be controlled and a transition condition between the steps.

2. Description of the Related Art

Conventionally, ladder logic (ladder language), sequential function chart (SFC language), function block diagram (FBD language), etc. are known as programming languages for programmable controllers that control equipment to be controlled such as a machine tool, as specified in the IEC 61131-3 standard. In the SFC language, the flow of an individual control process is written like a flowchart. In recent years, the SFC language has been increasingly used as programs written in the SFC language are very clear.

However, programs in the SFC language are written on the assumption that steps provided for respective operation units of equipment to be controlled are sequentially executed from the very first step. Accordingly, if the equipment stops due to an abnormality while the programmable controller is executing a program written in the SFC language, it is difficult to resume the control process from the step where the abnormality occurred, when the equipment is restarted after a process of handling the abnormality is performed.

In view of this problem, the applicant proposes a programmable controller that allows equipment to be controlled to be appropriately restarted even if the equipment stops during execution of a program written in the SFC language (see Japanese Patent Application Publication No. 2008-97079 (JP 2008-97079 A)).

In the programmable controller described in JP 2008-97079 A, however, a ladder program written in the ladder language is assigned to each transition that shows a transition condition between steps, and this ladder program is configured by combining a mid-start flag that is set when the equipment is restarted with a starting condition for the step immediately before each transition, etc. Programming for this programmable controller therefore involves a large amount of work. Moreover, when performing a process of handling an abnormality, the operator sometimes performs an individual operation, namely an operation of individually operating the equipment by the operation unit. In such a case, the state of the equipment is changed by the individual operation. It is therefore particularly difficult to resume the continuous operation from an appropriate step when the equipment is restarted.

SUMMARY OF THE INVENTION

It is one object of the present invention to make it possible in a monitoring device for a programmable controller which monitors the programmable controller executing a program written in the SFC language to easily resume continuous operation from an appropriate step according to the state of equipment to be controlled when the equipment is restarted after a process of handling an abnormality.

According to an aspect of the present invention, in a monitoring device for a programmable controller, the programmable controller executes a program written so as to include steps provided for respective operation units of equipment to be controlled and a transition condition between the steps, and the monitoring device monitors the programmable controller. The monitoring device includes: a read device that reads operating state information showing an operating state of the equipment from the programmable controller during individual operation of individually operating the equipment by the operation unit; a relationship information storage device that stores relationship information showing relationship between the first step to be executed when the equipment is restarted to resume continuous operation of the steps after the individual operation and the operating state information; a selection device that refers to the operating state information and selects from the steps the first step to be executed when the equipment is restarted, based on the relationship information; and a command transmission device that transmits to the programmable controller a command to change restart position information stored in the programmable controller as information showing the first step to be executed when the equipment is restarted, based on the selection result of the selection device.

According to the present invention, in the monitoring device for a programmable controller which monitors the programmable controller executing a program written in the SFC language, continuous operation can be easily resumed from an appropriate step according to the state of equipment to be controlled when the equipment is restarted after a process of handling an abnormality.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 8 is an illustration showing in a tabular form an example of setting of relationship information;

DETAILED DESCRIPTION OF EMBODIMENTS

Figure 1:
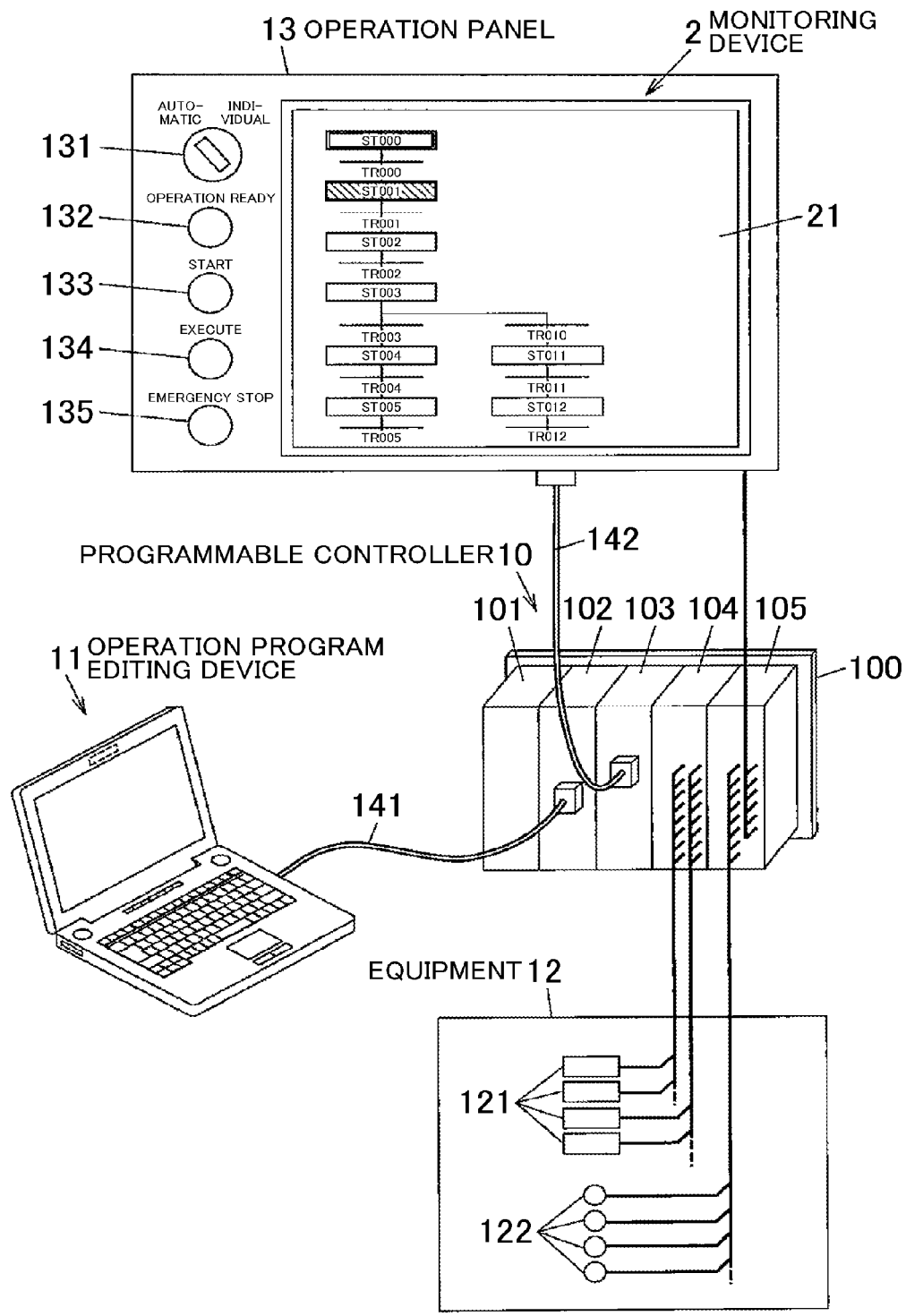
FIG. 1 is a configuration diagram showing an operation panel having a monitoring device for a programmable controller according to a first embodiment of the present invention, and the programmable controller, an operation program editing device, and equipment to be controlled.

A first embodiment of the present invention will be described with reference to FIGS. 1 to 7. FIG. 1 is a configuration diagram showing an operation panel 13 having a monitoring device 2 for a programmable controller according to the first embodiment of the present invention, a programmable controller 10, an operation program editing device 11, and equipment 12 as equipment to be controlled.

The programmable controller 10 has a power supply module 101, a CPU module 102, a communication module 103, an output module 104, an input module 105, and a base 100 having these modules mounted thereon. The power supply module 101 supplies power to the CPU module 102 etc. via the base 100. The communication module 103 communicates with the monitoring device 2 mounted on the operation panel 13.

The output module 104 has a plurality of output relays connected to a plurality of actuators 121 in the equipment 12. For example, each of the actuators 121 is formed by a solenoid, a motor, an electromagnetic switching valve that controls an oil pressure, etc. The input module 105 has a plurality of input relays connected to a plurality of sensors 122 in the equipment 12. For example, each of the sensors 122 is formed by a proximity sensor, a photoelectric sensor, a limit switch, etc.

The CPU module 102 controls the equipment 12 by executing an operation program edited by the operation program editing device 11 and switching on or off the contact point of each output relay of the output module 104 according to the state of each input relay of the input module 105 etc. In the present embodiment, the equipment 12 is a machine tool, and the equipment 12 performs a predetermined machining operation such as cutting or grinding with a loaded workpiece being clamped.

The operation program editing device 11 is formed by an information processing device having a display screen. In the present embodiment, the operation program editing device 11 is formed by a mobile computer (notebook computer). The operation program editing device 11 has a function to edit an operation program to be executed by the programmable controller 10 and a function to transfer the edited operation program to the CPU module 102 of the programmable controller 10 via a communication cable 141. This operation program includes an SFC program written in the SFC language so as to include steps provided for respective operation units of the equipment 12 and transitions each showing a transition condition between the steps.

The CPU module 102 stores therein in-execution flags and execution complete flags showing the execution states of the steps of the SFC program. The CPU module 102 refers to these flags and executes the SFC program according to the on/off states of these flags. The on/off states of the in-execution flags and the execution complete flags are retained even if the power of the programmable controller 10 is shut off while the CPU module 102 is executing the SFC program. Namely, when the programmable controller 10 is powered back on, the on/off states of the in-execution flags and the execution complete flags are the same as they were when the power of the programmable controller 10 was shut off.

The operation panel 13 has the monitoring device 2, an automatic/individual select switch 131, an operation ready switch 132, a start switch 133, an execute switch 134, and an emergency stop switch 135. The automatic/individual select switch 131 is a select switch for selecting between two modes. The operation ready switch 132, the start switch 133, the execute switch 134, and the emergency stop switch 135 are push button switches.

The automatic/individual select switch 131 is a switch for switching between an automatic operation mode and an individual operation mode. The automatic operation mode is a mode in which the programmable controller 10 continuously operates according to the operation program edited by the operation program editing device 11. The individual operation mode is a mode in which the equipment 12 is individually operated by the operation unit. The operation ready switch 132 is a switch for enabling the actuators 121 of the equipment 12. The start switch 133 is a switch for sending a command to start the automatic operation. The execute switch 134 is a switch for sending a command to perform the individual operation in the individual operation mode. The emergency stop switch 135 is a switch for immediately stopping the operation of the equipment 12. These switches 131 to 135 are connected to the input module 105 of the programmable controller 10.

The monitoring device 2 is connected to the communication module 103 of the programmable controller 10 via a communication cable 142 to monitor the programmable controller 10. The monitoring device 2 can read the on/off state of each output relay of the output module 104, the on/off state of each input relay of the input module 105, and various information stored in the CPU module 102 by communicating with the communication module 103. The monitoring device 2 can also read from the programmable controller 10 the operation program stored in the CPU module 102. The monitoring device 2 displays on a display 21 the execution status of the operation program that is executed by the CPU module 102 of the programmable controller 10.

The monitoring device 2 displays the operating state of the programmable controller 10 by displaying on the display 21 the step being executed by the CPU module 102 and the steps before and after this step. For example, the monitoring device 2 displays the step being executed by the CPU module 102 in a different color from that of the other steps so that the step being executed by the CPU module 102 can be distinguished from the other steps. In the example of FIG. 1, the hatched box represents the step being executed by the CPU module 102.

An operator such as a person in charge of maintenance who handles any abnormality that has occurred in the equipment 12 can visually recognize the operating state of the programmable controller 10 based on the information displayed on the display 21. The operating state includes information on the step at which the SFC program has stopped in the case where the equipment 12 has stopped during automatic operation.

Figure 2:
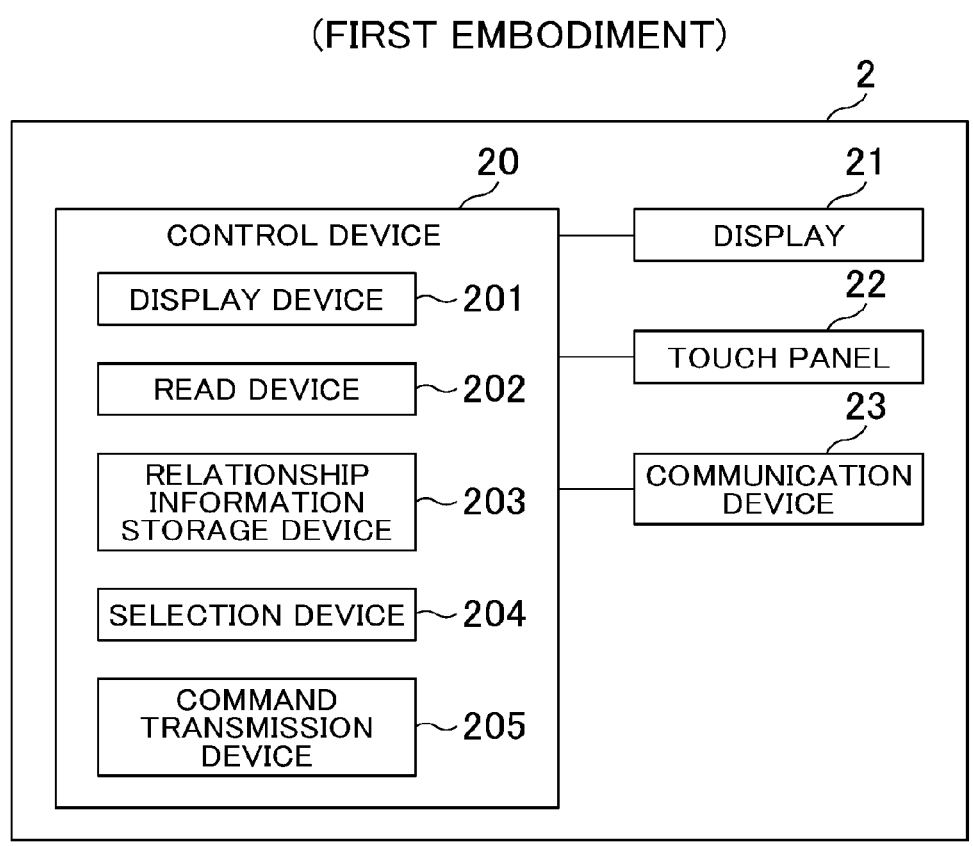
FIG. 2 is a block diagram showing the functional configuration of the monitoring device.

FIG. 2 is a block diagram showing the functional configuration of the monitoring device 2. The monitoring device 2 has a control device 20, the display 21, a touch panel 22, and a communication device 23. The control device 20 has a micro-processing unit (MPU) and its peripheral circuit, a storage element, etc. The communication device 23 communicates with the communication module 103 of the programmable controller 10. The control device 20 functions as a display device 201, a read device 202, a relationship information storage device 203, a selection device 204, and a command transmission device 205 as the MPU executes a system program stored in advance in the storage element. The functions implemented by these devices will be described later.

The display 21 is a display such as a liquid crystal display or a plasma display and displays an image on a display screen based on an image signal that is output from the control device 20. The touch panel 22 is formed by a base material made of a translucent sheet-like resin and multiple touch sensor elements mounted thereon. The touch panel 22 is placed on the display screen of the display 21. When the operator touches the touch panel 22, the control device 20 can recognize the touched position based on detection signals of the touch sensor elements. For example, the communication device 23 communicates with the communication module 103 of the programmable controller 10 by an Ethernet (registered trademark) protocol.

The display device 201 displays on the display 21 the step being executed by the programmable controller 10 and a plurality of steps before and after this step out of a plurality of steps of the SFC program read from the programmable controller 10 via the communication device 23. More specifically, the display device 201 reads the states of the in-execution flags stored in the programmable controller 10 as flags showing the execution states of the steps of the SFC program. Based on the states of the in-execution flags thus read, the display device 201 identifies the step being executed by the programmable controller 10 and displays this step on the display 21 in such a manner that this step can be distinguished from the other steps.

For example, in the case where the equipment 12 stops during automatic operation due to any abnormality and the individual operation of the equipment 12 is performed to handle the abnormality, the read device 202 reads operating state information from the programmable controller 10. The operating state information is information showing the operating state of the equipment 12, and includes information on the states of signals of the sensors 122 read from the input module 105 by the CPU module 102 and various flags, registers, etc. stored in the CPU module 102.

The relationship information storage device 203 stores relationship information showing the relationship between the first step to be executed out of the plurality of steps of the SFC program when the equipment 12 is restarted to resume the continuous operation of the steps after the individual operation of the equipment 12 and the operating state information read from the programmable controller 10 by the read device 202. The relationship information is set by, e.g., the creator of the SFC program, and can be referred to, created, and changed by using the operation program editing device 11 (see FIG. 1). For example, the creator of the SFC program sets the relationship information in a tabular form.

The selection device 204 refers to the operating state information read by the read device 202 and selects from the plurality of steps of the SFC program the first step to be executed when the equipment 12 is restarted, based on the relationship information stored in the relationship information storage device 203.

Based on the selection result of the selection device 204, the command transmission device 205 transmits to the programmable controller 10 a command to change restart position information stored in the programmable controller 10. The restart position information is information showing the first step to be executed when the equipment 12 is restarted. In the present embodiment, the in-execution flags correspond to the restart position information.

Figure 3:
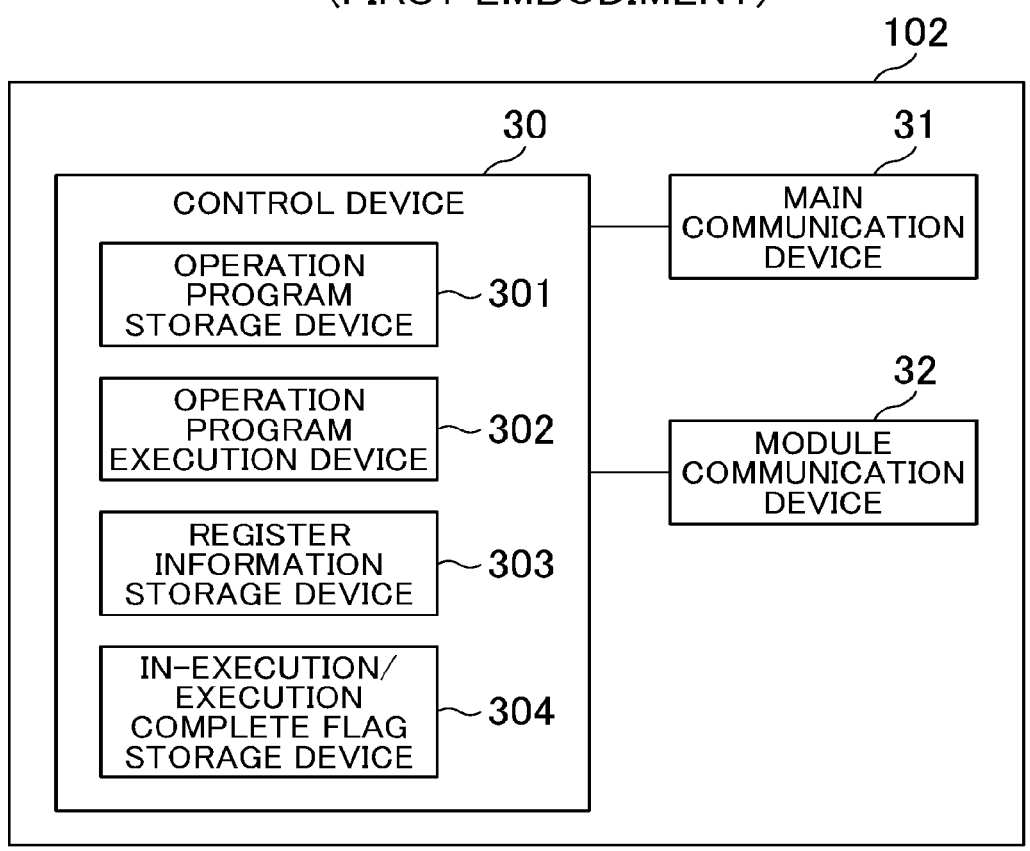
FIG. 3 is a block diagram showing the functional constitution of a CPU module of the programmable controller.

FIG. 3 is a block diagram showing the functional constitution of the CPU module 102 of the programmable controller 10. The CPU module 102 has a control device 30, a main communication device 31, and a module communication device 32. The control device 30 has an MPU and its peripheral circuit, a storage element, etc. The main communication device 31 communicates with the operation program editing device 11. The module communication device 32 communicates with the communication module 103, the output module 104, and the input module 105. The control device 30 functions as an operation program storage device 301, an operation program execution device 302, a register information storage device 303, and an in-execution/execution complete flag storage device 304 as the MPU executes a system program stored in advance in the storage element.

The operation program storage device 301 obtains an operation program for controlling the equipment 12 from the operation program editing device 11 by communication via the main communication device 31, and stores the obtained operation program in a nonvolatile storage element. This operation program is comprised of an SFC program written so as to include a plurality of steps and transitions each showing a transition condition between the steps, and a ladder program written in the ladder language and assigned to each step and each transition in the SFC program.

The operation program execution device 302 executes the operation program stored in the operation program storage device 301. After executing the process of one step, the operation program execution device 302 executes the process of the subsequent step if the transition condition written immediately after the step is satisfied.

Specifically, the process of each step is executed by switching on or off the output relays of the output module 104 via the module communication device 32 and operating the actuators 121 of the equipment 12. Whether the transition condition for the transition has been satisfied or not is determined based on whether the states of the signals of the sensors 122 of the equipment 12 obtained from the input module 105 via the module communication device 32 match the transition condition or not.

The register information storage device 303 stores information on the on/off states of the output relays of the output module 104, information on the on/off state of the input relays of the input module 105, information on the on/off states of an internal relay and a keep relay which are used in the operation program, and information on various registers such as a data register which are used in the operation program. The information stored in the register information storage device 303 is updated when the operation program is executed by the operation program execution device 302.

The internal relay and the keep relay are virtual relays that are not assigned to the output module 104 and the input module 105, and are used for convenience to write the operation program. The internal relay is switched off when the power of the programmable controller 10 is back on after being shut off. The on/off state of the keep relay is stored in a nonvolatile memory and is retained even when the power of the programmable controller 10 is shut off.

The in-execution/execution complete flag storage device 304 stores the in-execution flags and the execution complete flags. The in-execution flag and the execution complete flag are provided for each step of the SFC program. The in-execution flag is in an on state (1) when a corresponding one of the steps is being performed by the operation program execution device 302, and is in an off state (0) otherwise. The execution complete flag is changed from an off state (0)

to an on state (1) when a corresponding one of the steps has been executed by the operation program execution device 302 after execution of the SFC program is started from the very first step, and the transition condition for the transition immediately downstream of the corresponding step has been satisfied.

An operation example of the SFC program and the in-execution flags and the execution complete flags will be described with reference to FIGS. 4 and 5.

Figure 4:
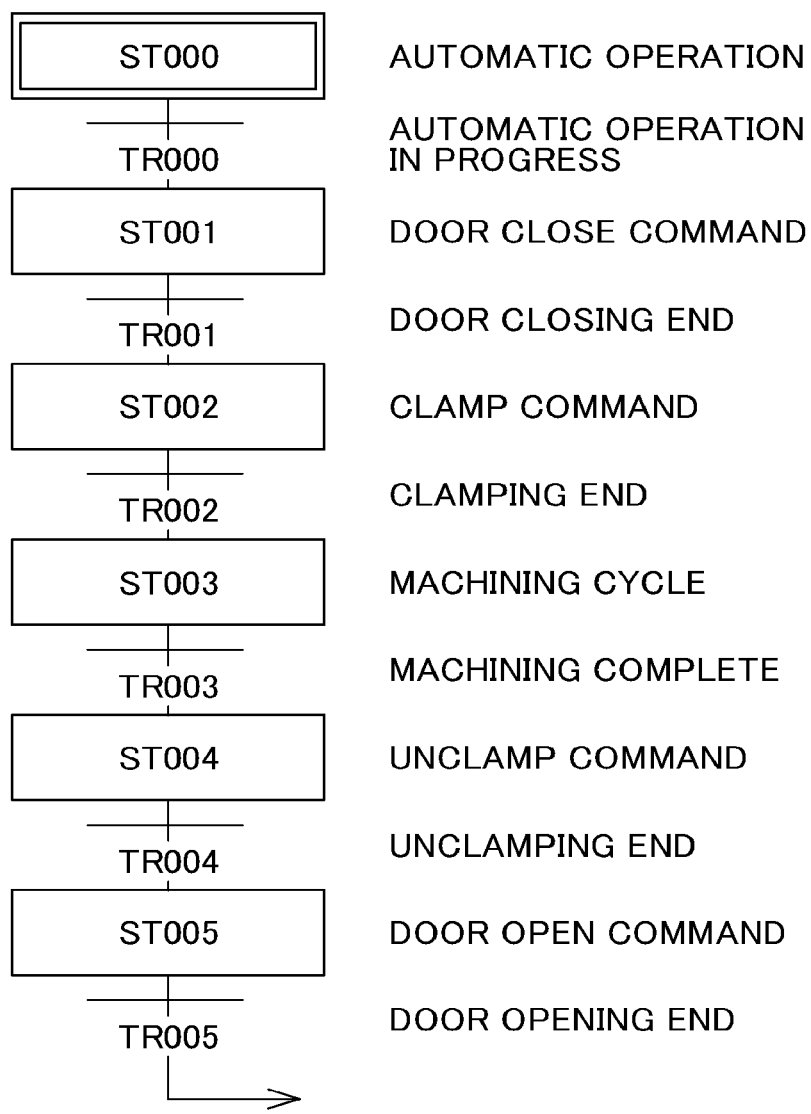
FIG. 4 shows an example of an SFC program that is executed by the programmable controller.

FIG. 4 shows an example of the SFC program to be executed by the CPU module 102 of the programmable controller 10. The SFC program is written according to the IEC 61131-3 standard so that a plurality of steps showing individual control processes and transitions each showing a transition condition between the steps are alternately arranged. ST000, which is the very first step of the SFC program, is the step indicating the automatic operation. When the automatic operation is started, the programmable controller 10 sequentially performs the control processes of the steps from ST000, which is the most upstream step in the SFC program, toward the downstream side.

The SFC program shown in FIG. 4 is configured so that the control processes of the steps, namely a door close command (ST001), a clamp command (ST002), a machining cycle (ST003), an unclamp command (ST004), and a door open command (ST005), are sequentially performed.

The door close command is a command to close a workpiece load door of the equipment 12, and the actuator 121 that closes the door is operated by execution of the door close command (ST001). It is necessary to pass the transition TR001 in order to execute the process of the step of the clamp command (ST002) immediately downstream of the door close command (ST001) after execution of the control process of the step of the door close command (ST001). The transition condition for the transition TR001 is "door closing end." Accordingly, this transition condition is satisfied when the signal of the sensor 122 indicating that the door (workpiece load door) has been closed to the closing end is input to the input module 105. The transition TR001 can be passed when this transition condition is satisfied. The programmable controller 10 executes the clamp command (ST002), which is the step immediately downstream of the transition TR001. This clamp command is a command to operate a damper for fixing a workpiece to clamp the workpiece. Similarly, when the transition condition for each transition (TR002, TR003, TR004, TR005) is satisfied, the control process of the step immediately downstream of the corresponding command is executed.

A ladder program is assigned to each step and each transition. The ladder program assigned to each step is a program that, under a predetermined condition, switches on or off the output contact points of the output module 104 connected to the actuators 121 of the equipment 12. The predetermined condition includes various interlock signals for ensuring the safety of the operation of the equipment 12, etc. In the ladder program assigned to each transition, the transition condition to the subsequent step is set so as to include the contact points of the input relays of the input module 105 which indicate that the operation of the control process of the previous step has been completed.

The CPU module 102 of the programmable controller 10 stores the execution status of each step by using the in-execution flags and the execution complete flags.

Figure 5:
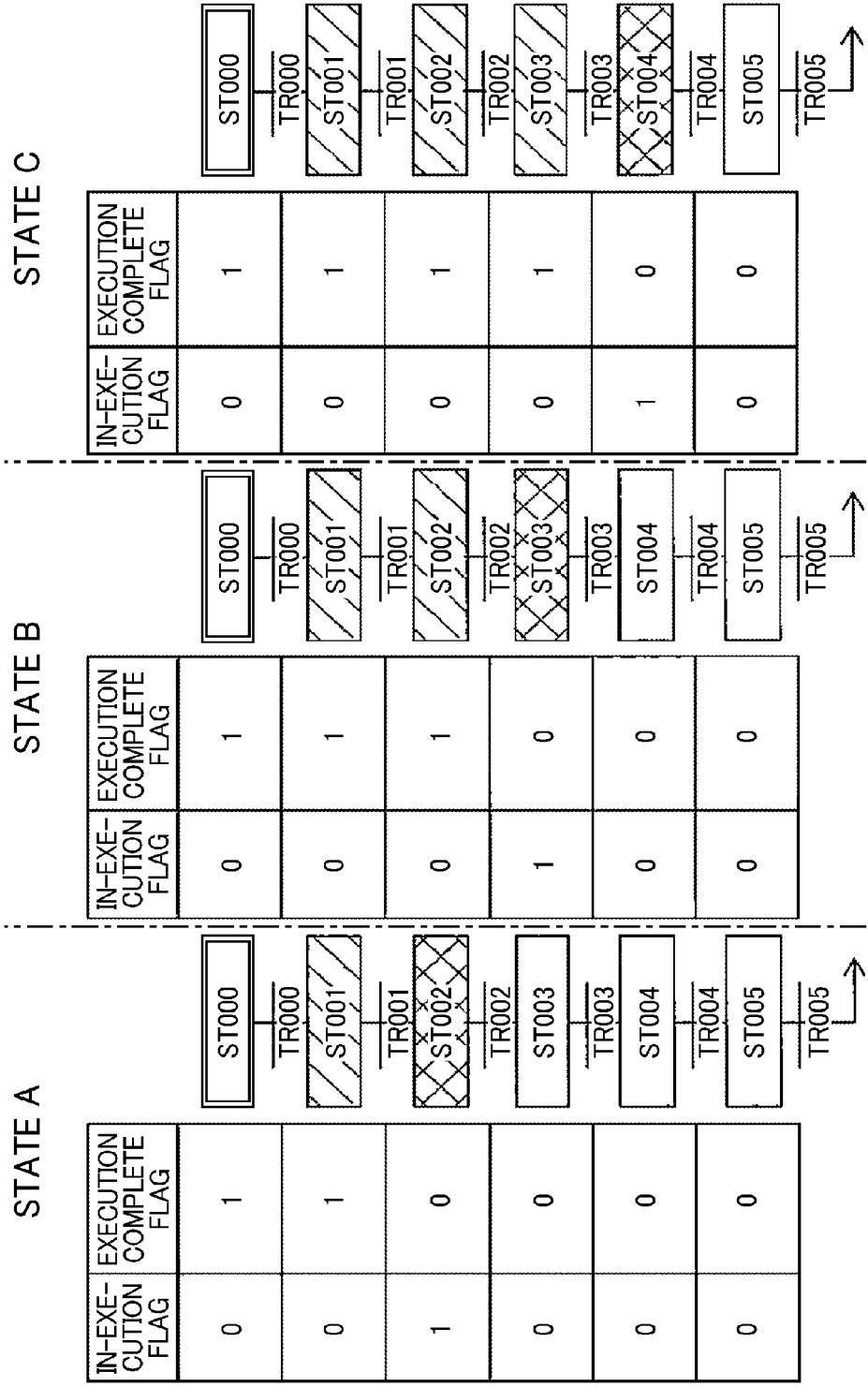
FIG. 5 is an illustration showing, together with the SFC program, how in-execution flags and execution complete flags change.

FIG. 5 is an illustration showing, together with the SFC program, how the in-execution flags and the execution complete flags change. In FIG. 5, the cross-hatched boxes represent the step that is being executed by the programmable controller 10, and the hatched boxes represent the step that has been executed by the programmable controller 10. In FIG. 5, the states (on: 1, off: 0) of the in-execution flag and the execution complete flag that correspond to each step are shown on the left side of the step.

State A of FIG. 5 is the state where the programmable controller 10 has executed the control process of the step ST001 and is executing the control process of the step ST002. In this state, the in-execution flag corresponding to the step ST002 is 1 (on) and the in-execution flags for the other steps are 0 (off). The execution complete flags corresponding to the step ST001 and the step upstream of the step ST001 are 1 (on), and the execution complete flags for the steps downstream of the step ST001 are 0 (off).

If the transition condition for the transition TR002 is satisfied in State A of FIG. 5, the programmable controller 10 executes the control process of the step ST003. At this time, as shown in State B of FIG. 5, the in-execution flag corresponding to the step ST003 is set to 1 (on), and the in-execution flag corresponding to the step ST002 is set to 0 (off). Moreover, the execution complete flag corresponding to the step ST002 is set to 1 (on).

When the transition condition for the transition TR003 is satisfied in State B of FIG. 5, the programmable controller 10 executes the control process of the step ST004 (State C). At this time, the in-execution flag corresponding to the step ST004 is set to 1 (on), the in-execution flag corresponding to the step ST003 is set to 0 (off), and the execution complete flag corresponding to the step ST003 is set to 1 (on).

For example, each step whose execution complete flag is 1 (on) is displayed in a green background color, and each step whose in-execution flag is 1 (on) is displayed in an orange background color on the display 21 of the monitoring device 2. In this case, as the control process of each step is executed according to the SFC program, the step displayed in the orange background color sequentially moves toward downstream side, and the number of steps displayed in the green background color increases gradually.

As described above, the on/off states of the in-execution flags and the execution complete flags are retained even if the power of the programmable controller 10 is shut off. When the programmable controller 10 is powered back on and a command to resume the automatic operation is sent by the automatic/individual select switch 131 and the start switch 133, the CPU module 102 of the programmable controller 10 resumes the control process from the step whose in-execution flag is 1 (on).

The equipment 12 may stop during automatic operation due to various factors. For example, if machining of a workpiece in the machining cycle (ST003) is not completed due to damage to a cutting tool for machining the workpiece, the transition condition for the transition TR003 is not satisfied, and the equipment 12 stops. In such a case, the operator checks the information on the display 21 of the monitoring device 2 to identify the step at which the equipment 12 has stopped. The operator then switches the automatic/individual select switch 131 on the operation panel 13 to the individual operation mode and operates the equipment 12 by the individual operation so that the equipment 12 is ready for a process of handling the abnormality such as replacement of the cutting tool. The operator shuts off the power of the programmable controller 10 and the equipment 12 for safety and replaces the cutting tool.

Figure 6:
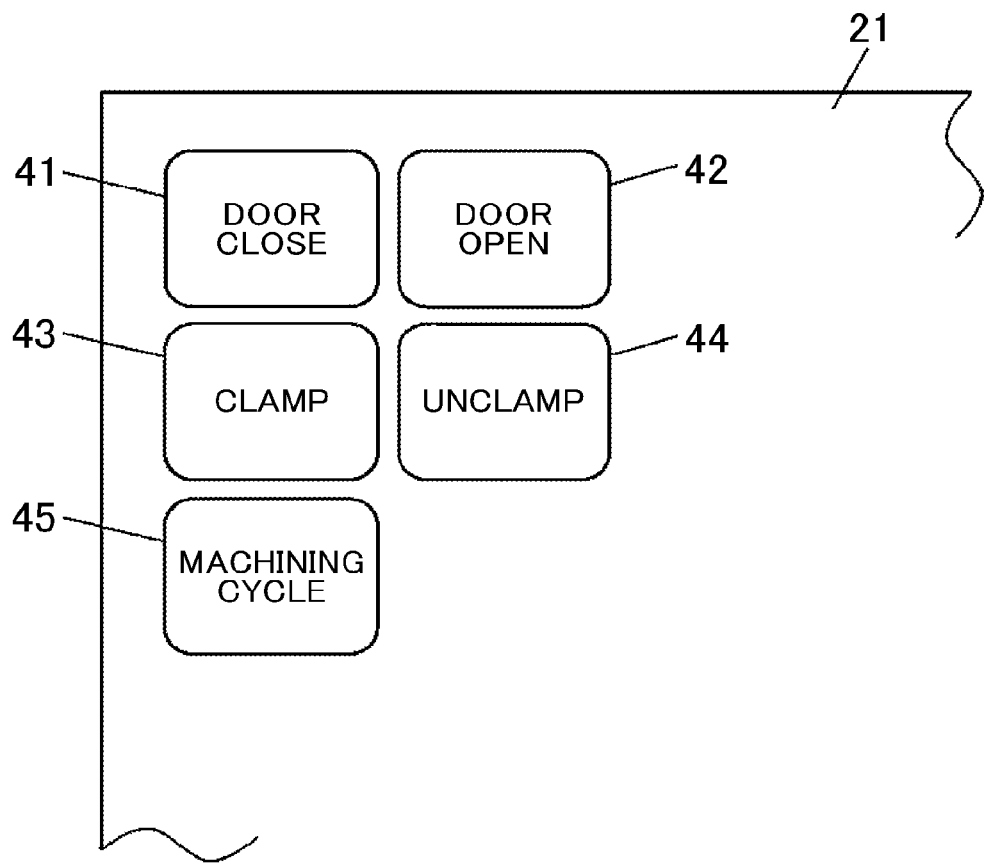
FIG. 6 shows an example of an individual operation screen that is displayed on a display of the operation panel.

FIG. 6 shows an example of an individual operation screen that is displayed on the display 21 when the automatic/individual select switch 131 on the operation panel 13 is switched to the individual operation mode. In this example, a first command button 41 "DOOR CLOSE," a second command button 42 "DOOR OPEN," a third command button 43 "CLAMP," a fourth command button 44 "UNCLAMP," and a fifth command button 45 "MACHINING CYCLE" are displayed on the display 21. When the operator performs a touch operation, namely presses any of the first to fifth command buttons 41 to 45, the touch sensor elements of the touch panel 22 placed on the display screen of the display 21 generate a detection signal in response to the touch operation. The control device 20 of the monitoring device 2 recognizes that the touch operation has been performed on one of the first to fifth command buttons 41 to 45 based on the detection signals of the touch sensor elements. The control device 20 of the monitoring device 2 transmits this recognition result to the programmable controller 10 via the communication device 23.

The CPU module 102 of the programmable controller 10 obtains via the communication module 103 the recognition result of the touch operation transmitted from the monitoring device 2. In response to an operation of depressing the execute switch 134 on the operation panel 13, the CPU module 102 of the programmable controller 10 executes a corresponding control process. The control device 30 of the CPU module 102 executes the control process of the door close command (ST001) if the touch operation is performed on the first command button 41, executes the control process of the door open command (ST005) if the touch operation is performed on the second command button 42, executes the control process of the clamp command (ST002) if the touch operation is performed on the third command button 43, executes the control process of the unclamp command (ST004) if the touch operation is performed on the fourth command button 44, and executes the control process of the machining cycle (ST003) if the touch operation is performed on the fifth command button 45.

If the equipment 12 stops due to an abnormality, the operator performs the individual operation of the equipment 12 so that the equipment 12 is ready for a process of handling the abnormality. The operator then shuts off the power of the programmable controller 10 and the equipment 12 and performs a required process to handle the abnormality such as replacement of the cutting tool. The operator then turns the programmable controller 10 and the equipment 12 back on and switches the automatic/individual select switch 131 to the automatic operation mode. The operator then depresses the start switch 133 to resume the automatic operation of the equipment 12.

Conventional monitoring devices cannot read the operating state information showing the operating state of the equipment 12 from the programmable controller 10 during individual operation. However, the monitoring device 2 of the present embodiment reads the operating state information showing the operating state of the equipment 12 from the programmable controller 10 by the read device 202 during individual operation. Based on the operating state information, the selection device 204 selects the first step to be executed when the equipment 12 is restarted, and the command transmission device 205 transmits to the programmable controller 10 a command to set the in-execution flag of the selected step to the on state. The selection process of the selection device 204, the transmission process of the command transmission device 205 may be executed as appropriate during individual operation, or may be executed, for example, when the automatic/individual select switch 131 is switched to the automatic operation mode.

Figure 7:
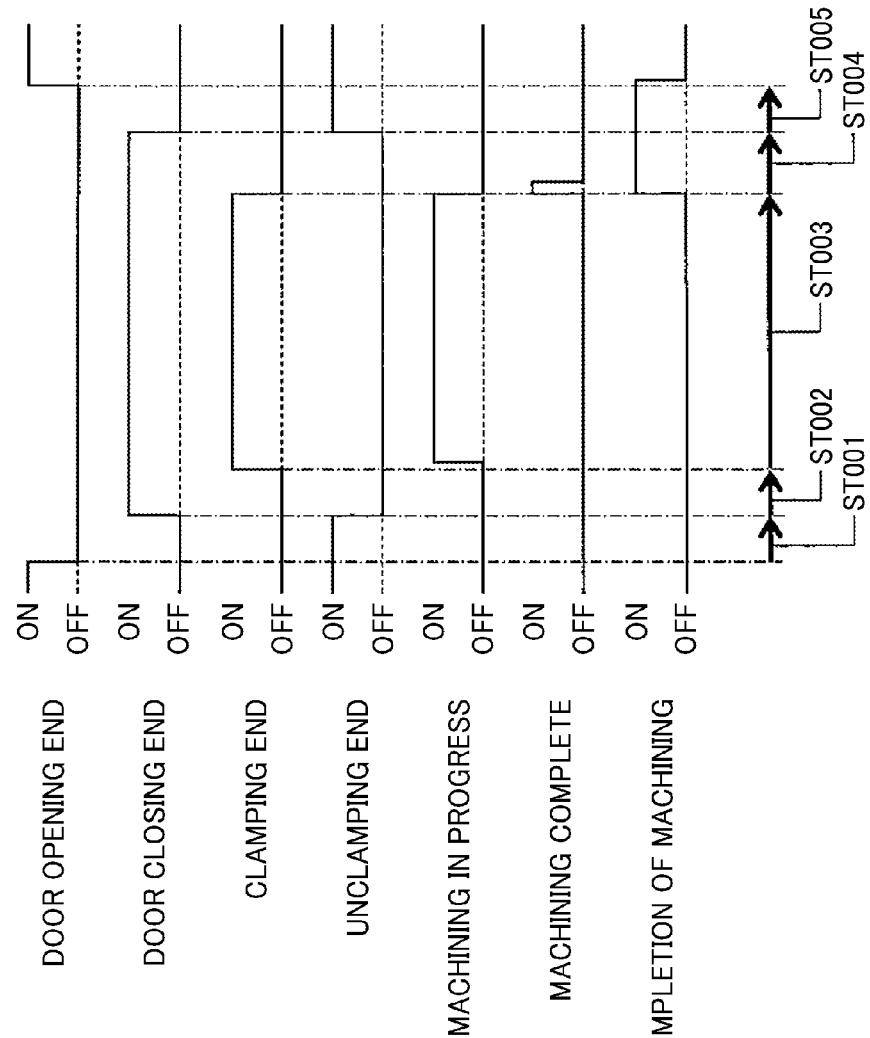
FIG. 7 is a timing chart showing an example of how operating state information that is read from the programmable controller by a read device of the monitoring device changes with time.

FIG. 7 is a timing chart showing an example of how the operating state information that is read from the programmable controller 10 by the read device 202 of the monitoring device 2 changes with time. The numbers of the steps that are being executed in each period in the timing chart are also shown in FIG. 7.

The control device 20 of the monitoring device 2 reads from the programmable controller 10 the operating state information, namely "door opening end," "door closing end," "clamping end," "unclamping end," "machining in progress," "machining complete," and "keep completion of machining." Of the operating state information, "door opening end," "door closing end," "clamping end," "unclamping end," and "machining complete" are the states of the contact points of the input relays of the input module 105 which are connected to the sensors 122 of the equipment 12. The operating state information "machining in progress" is the state of the contact point of the internal relay of the CPU module 102. The operating state information "keep completion of machining" is the state of the contact point of the keep relay of the CPU module 102.

The keep relay is set to an on state when the input relay showing "machining complete" is turned on, and is reset to an off state when operation of a single cycle of the equipment 12 is finished, specifically when the input relay showing "door opening end" is turned on. For example, the keep relay is set to the on state by the process of the ladder program assigned to the transition TR003, and is reset to the off state by the process of the ladder program assigned to the transition TR005.

As shown in FIG. 7, the operation until "door closing end" is set to an on state is performed as the control process of the door close command (ST001). The operation until "clamping end" is set to an on state is performed as the control process of the clamp command (ST002) The operation until "machining complete" is set to an on state is performed as the control process of the machining cycle (ST003). The operation until "unclamping end" is set to an on state is performed as the control process of the unclamp command (ST004). The operation until "door opening end" is set to an on state is performed as the control process of the door open command (ST005).

In the following description, the on/off states of the five kinds of operating state information, namely "door opening end," "door closing end," "clamping end," "unclamping end," and "keep completion of machining," are represented by five-digit strings of 1s (on) and 0s (off) in this order. The on/off states of the five kinds of operating state information at the time the control process of the door close command (ST001) is started are represented by "10010." Similarly, the on/off states of the five kinds of operating state information at the time the control process of the clamp command (ST002) is started are represented by "00010." The on/off states of the five kinds of operating state information at the time the control process of the machining cycle (ST003) is started are represented by "01100." The on/off states of the five kinds of operating state information at the time the control process of the unclamp command (ST004) is started are represented by "01101." The on/off states of the five kinds of operating state information at the time the control process of the door open command (ST005) is started are represented by "01001."

FIG. 8 is an illustration showing in a tabular form an example of setting of the relationship information stored in the relationship information storage device 203. The relationship information is set similarly to the on/off states of the five kinds of operating state information, namely "door opening end," "door closing end," "clamping end," "unclamping end," and "keep completion of machining," at the time the control process of each step is started.

In FIG. 8, information on which of the steps of the door close command (ST001), the clamp command (ST002), the machining cycle (ST003), the unclamp command (ST004), and the door open command (ST005) should be selected as the first step to be executed when the equipment 12 is restarted is shown by "1" (on) or "0" (off) in each row of "door opening end," "door closing end," "clamping end," "unclamping end," and "keep completion of machining."

If the five kinds of operating state information, namely "door opening end," "door closing end," "clamping end," "unclamping end," and "keep completion of machining," read from the programmable controller 10 during individual operation are "10010," the monitoring device 2 sets the in-execution flag of the step of the door close command (ST001) to the on state and transmits to the programmable controller 10 a command to set the in-execution flags of the other steps to the off state. The control process of the door close command (ST001) is thus executed first when the equipment 12 is restarted.

For example, if an abnormality occurs in the equipment 12 during execution of the control process of the machining cycle (ST003) and the on/off states of the five kinds of operating state information are "10010" due to the individual operation, the continuous operation of the equipment 12 is resumed from the step ST001, which is an optimal step based on the state of the equipment 12 at that time. Similarly, if the on/off states of the five kinds of operating state information are "00010" due to the individual operation, the continuous operation of the equipment 12 is resumed from the step ST002. If the on/off states of the five kinds of operating state information are "01100" due to the individual operation, the continuous operation of the equipment 12 is resumed from the step ST003. If the on/off states of the five kinds of operating state information are "01101" due to the individual operation, the continuous operation of the equipment 12 is resumed from the step ST004. If the on/off states of the five kinds of operating state information are "01001" due to the individual operation, the continuous operation of the equipment 12 is resumed from the step ST005.

According to the first embodiment, even if the equipment 12 stops during its continuous operation due to an abnormality and the state of the equipment 12 is changed by the individual operation in the process of handling the abnormality, the continuous operation of the equipment 12 can be resumed from an appropriate step according to the state of the equipment 12 at that time when the equipment 12 is restarted after the process of handling the abnormality.

A second embodiment of the present invention will be described with reference to FIGS. 9 and 10.

Figure 9:
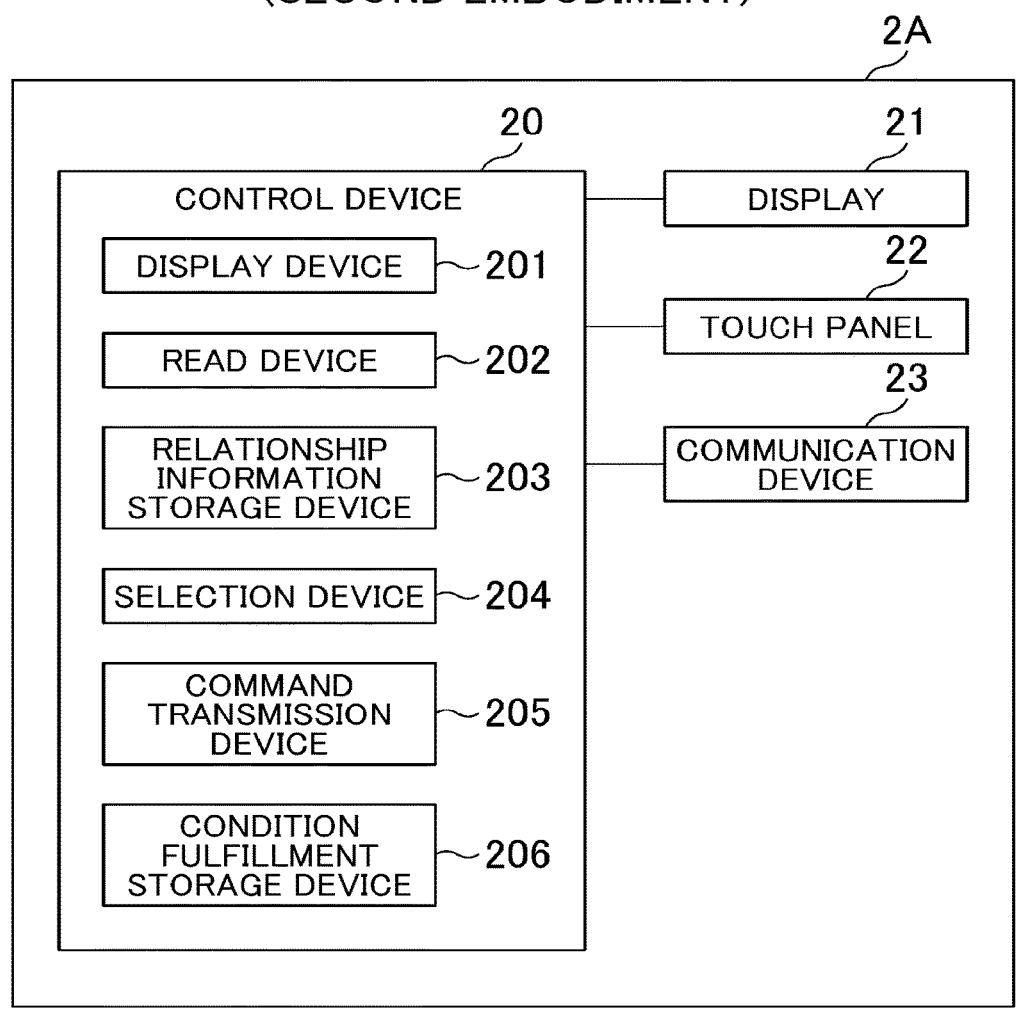
FIG. 9 is a block diagram showing the functional configuration of a monitoring device according to a second embodiment of the present invention.

FIG. 9 is a block diagram showing the functional configuration of a monitoring device 2A according to the present embodiment. The monitoring device 2A of the present embodiment further includes a condition fulfillment storage device 206 in addition to the display device 201, the read device 202, the relationship information storage device 203, the selection device 204, and the command transmission device 205. The condition fulfillment storage device 206 stores the information that the operating state information read from the programmable controller 10 by the read device 202 during individual operation has satisfied a predetermined condition, and retains this information even after the predetermined condition is no longer satisfied.

In the present embodiment, the relationship information storage device 203 stores relationship information showing the relationship between the first step to be executed out of the plurality of steps when the equipment 12 is restarted and the operating state information read from the programmable controller 10 and the information stored in the condition fulfillment storage device 206. In the present embodiment, the selection device 204 refers to the operating state information and the information stored in the condition fulfillment storage device 206 and selects from the steps of the SFC program the first step to be executed when the equipment 12 is restarted, based on the relationship information stored in the relationship information storage device 203.

Figure 10:
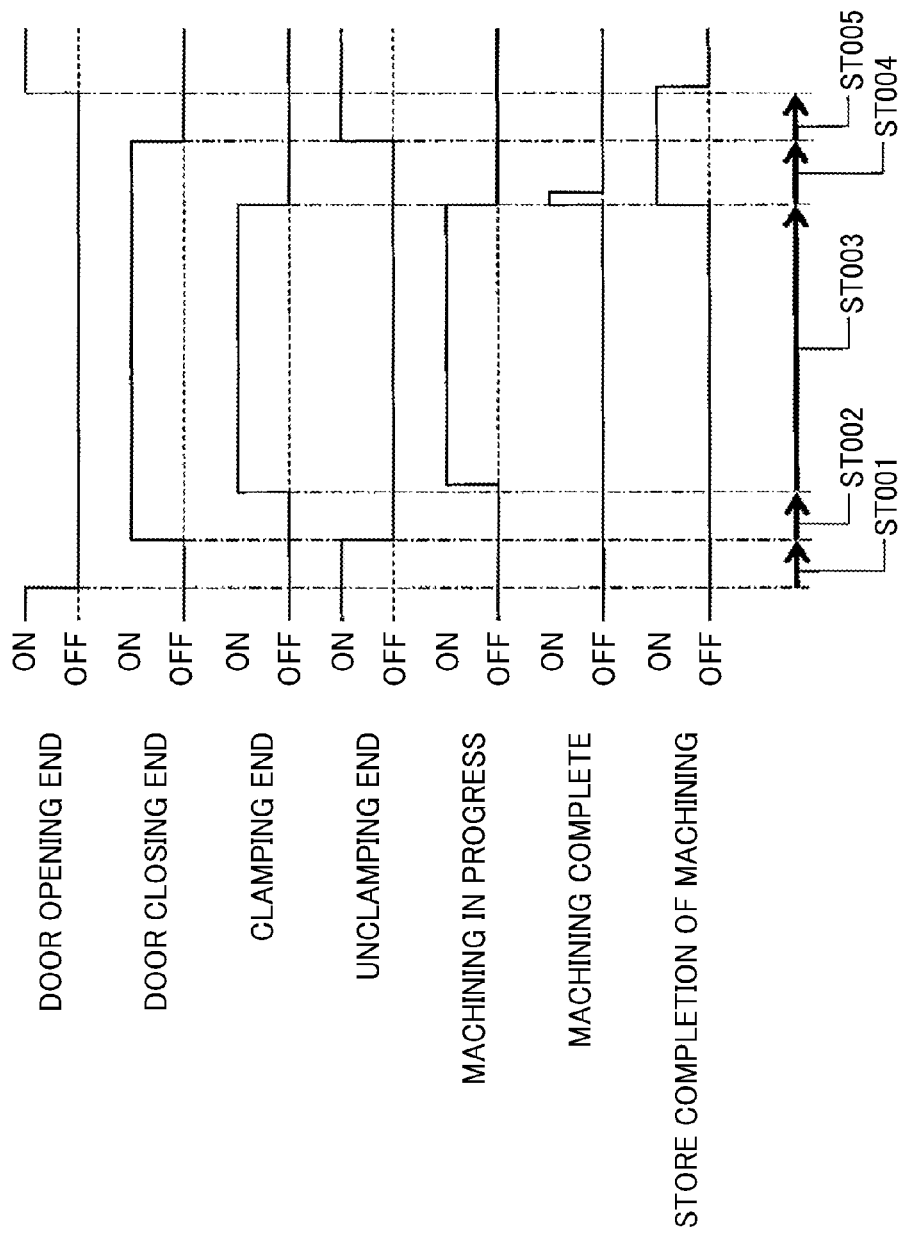
FIG. 10 is a timing chart in the case where a programmable controller according to the second embodiment executes the SFC program shown in FIG. 4.

FIG. 10 is a timing chart in the case where the programmable controller 10 executes the SFC program shown in FIG. 4. Unlike FIG. 7, this timing chart shows the on/off state of "store completion of machining," or a flag that is stored in the condition fulfillment storage device 206, instead of the operating state information of "keep completion of machining." Like the keep relay for "keep completion of machining" in the first embodiment, this flag "store completion of machining" is set to an on state when the input relay showing "machining complete" is turned on, and is set to an off state when the input relay showing "door opening end" is turned on. Namely, in this operation example, the condition fulfillment storage device 206 stores the information that the predetermined condition that the input relay showing "machining complete" is in an on state has been satisfied, and retains this information even after the input relay is turned off.

This predetermined condition may be either a simple condition that one specific input relay is in an on state as described above, or a more complicated condition that a plurality of kinds of operating state information are combined by an AND condition and/or an OR condition. For example, the predetermined condition of the condition fulfillment storage device 206 may be the condition that the input relay showing that machining of a workpiece has been started is in an on state, instead of the condition that the input relay showing "machining complete" is in an on state. In this case, this predetermined condition is satisfied when machining is started, instead of when machining is completed.

The relationship information storage device 203 stores relationship information showing the relationship between the first step to be executed when the equipment 12 is restarted and the operating state information "door opening end," "door closing end," "clamping end," and "unclamping end" read from the programmable controller 10 and the flag "store completion of machining," namely the information stored in the condition fulfillment storage device 206. In the operation example shown in FIG. 10, the on/off states of the information stored as the relationship information, namely the on/off states of the operating state information "door opening end," "door closing end," "clamping end," and "unclamping end" and the flag "store completion of machining" as the information stored in the condition fulfillment storage device 206, are similar to those described in the first embodiment. The relationship information of FIG. 8 having "keep completion of machining" replaced with "store completion of machining" is the relationship information according to the present embodiment.

According to the present embodiment, like the first embodiment, even if the equipment 12 stops during its continuous operation due to an abnormality and the state of the equipment 12 is changed by the individual operation in the process of handling the abnormality, the continuous operation of the equipment 12 can be resumed from an appropriate step according to the state of the equipment 12 at that time when the equipment 12 is restarted after the process of handling the abnormality. In the first embodiment, it is necessary to create a ladder program for setting the keep relay showing "keep completion of machining" to an on state and a ladder program for resetting this keep relay to an off state. However, such ladder programs need not be created in the present embodiment. This facilitates creation of the operation program.

The present invention may be modified as appropriate without departing from the spirit and scope of the invention. For example, the above embodiments are described with respect to the case where the monitoring device 2 is mounted on the operation panel 13. However, the present invention is not limited to this. For example, the operation program editing device 11 (see FIG. 1) may have a function similar to that of the control device 20 of the monitoring device 2, and this operation program editing device 11 may be used as a monitoring device.

What is claimed is:

1. A monitoring device for a programmable controller that executes a program written so as to include steps provided for respective operation units of equipment to be controlled and a transition condition between the steps, the monitoring device monitoring the programmable controller, the monitoring device comprising:
   a read device that reads operating state information showing an operating state of the equipment from the programmable controller during individual operation of individually operating the equipment by the operation unit;
   a relationship information storage device that stores relationship information showing relationship between the first step to be executed when the equipment is restarted to resume continuous operation of the steps after the individual operation and the operating state information;
   a selection device that refers to the operating state information and selects from the steps the first step to be executed when the equipment is restarted, based on the relationship information; and
   a command transmission device that transmits to the programmable controller a command to change restart position information stored in the programmable controller as information showing the first step to be executed when the equipment is restarted, based on the selection result of the selection device.

2. The monitoring device for the programmable controller according to claim 1, further comprising:
   a condition fulfillment storage device that stores information that the operating state information read by the read device during the individual operation has satisfied a predetermined condition, and retains this information even after the predetermined condition is no longer satisfied, wherein
   the relationship information storage device stores relationship information showing relationship between the first step to be executed out of the steps when the equipment is restarted and the operating state information and the information stored in the condition fulfillment storage device, and
   the selection device refers to the operating state information and the information stored in the condition fulfillment storage device and selects from the steps the first step to be executed when the equipment is restarted, based on the relationship information.

* * * * *